(12) United States Patent
Yeow et al.

(10) Patent No.: US 10,057,339 B2
(45) Date of Patent: Aug. 21, 2018

(54) RESOURCE ALLOCATION PROTOCOL FOR A VIRTUALIZED INFRASTRUCTURE WITH RELIABILITY GUARANTEES

(71) Applicants: Wai-Leong Yeow, Mountain View, CA (US); Cedric Westphal, San Francisco, CA (US); Ulas Kozat, Santa Clara, CA (US)

(72) Inventors: Wai-Leong Yeow, Mountain View, CA (US); Cedric Westphal, San Francisco, CA (US); Ulas Kozat, Santa Clara, CA (US)

(73) Assignee: NTT DOCOMO, INC., Tokyo (JP)

( * ) Notice: Subject to any disclaimer, the term of this patent is extended or adjusted under 35 U.S.C. 154(b) by 536 days.

(21) Appl. No.: 14/466,856

(22) Filed: Aug. 22, 2014

(65) Prior Publication Data
US 2014/0365664 A1    Dec. 11, 2014

Related U.S. Application Data

(62) Division of application No. 12/831,119, filed on Jul. 6, 2010, now Pat. No. 8,990,397.

(60) Provisional application No. 61/230,226, filed on Jul. 31, 2009.

(51) Int. Cl.
    *G06F 15/173*    (2006.01)
    *H04L 29/08*     (2006.01)
    *G06F 11/20*     (2006.01)

(52) U.S. Cl.
    CPC ........ *H04L 67/101* (2013.01); *G06F 11/2041* (2013.01); *H04L 67/1008* (2013.01); *G06F 11/2007* (2013.01); *G06F 11/2097* (2013.01)

(58) Field of Classification Search
    CPC .............. H04L 67/101; H04L 67/1008; G06F 11/2041; G06F 11/2007; G06F 11/2097
    See application file for complete search history.

(56) References Cited

U.S. PATENT DOCUMENTS

| | | | | |
|---|---|---|---|---|
| 5,787,271 A * | 7/1998 | Box | .................... | H04L 41/0896 370/225 |
| 6,639,976 B1 * | 10/2003 | Shellum | .............. | G06F 11/3409 379/111 |
| 7,877,627 B1 * | 1/2011 | Freydel | ............... | G06F 11/1633 714/11 |
| 7,878,594 B2 * | 2/2011 | Fukuzawa | ............ | B60N 2/2252 297/362 |
| 7,898,957 B2 * | 3/2011 | Lea | ......................... | H04L 45/04 370/235 |
| 8,160,063 B2 * | 4/2012 | Maltz | ..................... | H04L 45/02 370/254 |
| 8,473,557 B2 * | 6/2013 | Ramakrishnan | ...... | G06F 9/4856 709/206 |

(Continued)

*Primary Examiner* — Moustafa M Meky
*Assistant Examiner* — Blake Rubin
(74) *Attorney, Agent, or Firm* — Womble Bond Dickinson (US) LLP

(57) ABSTRACT

A method and apparatus is disclosed herein for a resource allocation protocol. In one embodiment, the apparatus comprises a resource allocation engine to allocate physical resources to primary and redundant virtual infrastructures, wherein, when the resource allocation engine allocates virtual infrastructures, physical resources of redundant virtual infrastructures are shared across multiple primary virtual infrastructures.

18 Claims, 8 Drawing Sheets

Comparison of fault tolerant architectures

(56) References Cited

U.S. PATENT DOCUMENTS

| | | | | |
|---|---|---|---|---|
| 2002/0062454 A1* | 5/2002 | Fung | | G06F 1/3203 713/300 |
| 2002/0097680 A1* | 7/2002 | Liu | | H04Q 3/0079 370/238 |
| 2002/0187770 A1* | 12/2002 | Grover | | H04L 45/00 455/403 |
| 2003/0058798 A1* | 3/2003 | Fleischer | | H04L 45/00 370/238 |
| 2003/0227877 A1* | 12/2003 | Kar | | H04L 45/08 370/252 |
| 2004/0109407 A1* | 6/2004 | Grover | | H04L 41/0663 370/218 |
| 2004/0151124 A1* | 8/2004 | Hauser | | H04L 41/0663 370/252 |
| 2005/0193227 A1* | 9/2005 | Nakahara | | G06F 11/203 714/4.1 |
| 2006/0112297 A1* | 5/2006 | Davidson | | G06F 11/1438 714/2 |
| 2006/0171316 A1* | 8/2006 | Ei-Sakkout | | H04Q 3/66 370/235 |
| 2007/0211637 A1* | 9/2007 | Mitchell | | H04L 45/04 370/238 |
| 2008/0198752 A1* | 8/2008 | Fan | | H04Q 3/0079 370/238 |
| 2008/0256384 A1* | 10/2008 | Branson | | G06F 11/2025 714/4.1 |
| 2008/0263388 A1* | 10/2008 | Allen | | G06F 11/2023 714/4.1 |
| 2008/0295094 A1* | 11/2008 | Korupolu | | G06F 9/5066 718/1 |
| 2009/0172168 A1* | 7/2009 | Sonoda | | G06F 9/5061 709/226 |
| 2009/0187795 A1* | 7/2009 | Doverspike | | H04L 43/02 714/43 |
| 2009/0307334 A1* | 12/2009 | Maltz | | H04L 29/12028 709/219 |
| 2009/0313503 A1* | 12/2009 | Atluri | | G06F 11/1453 714/19 |
| 2010/0125712 A1* | 5/2010 | Murase | | G06F 11/1458 711/162 |
| 2011/0154003 A1* | 6/2011 | Carrizo | | G06F 11/3452 713/1 |
| 2012/0110584 A1* | 5/2012 | Chaudhry | | G06F 9/5027 718/102 |
| 2013/0275386 A1* | 10/2013 | Shin | | G06F 21/6209 707/667 |
| 2014/0189441 A1* | 7/2014 | Ishida | | G06F 11/3006 714/47.3 |
| 2014/0298112 A1* | 10/2014 | Otsuka | | G06F 11/008 714/47.3 |

\* cited by examiner (a) Base virtual network (b) Simple 1 : k replication (c) n : k replication Comparison of fault tolerant architectures Number of redundant nodes required for node-reliability of 99.999%.
$p$ is the independent failure probability of each node.

Number of nodes $n$ : $k$ replication can support

RESOURCE ALLOCATION PROTOCOL FOR A VIRTUALIZED INFRASTRUCTURE WITH RELIABILITY GUARANTEES

PRIORITY

The present patent application is a divisional of U.S. patent application Ser. No. 12/831,119, titled, "Resource Allocation Protocol for a Virtualized Infrastructure with Reliability Guarantees", filed Jul. 6, 2010, which claims priority to and incorporates by reference the corresponding provisional patent application Ser. No. 61/230, 226, titled, "A Resource Allocation Protocol for Virtualized Infrastructure with Reliability Guarantees," filed on Jul. 31, 2009.

FIELD OF THE INVENTION

The present invention relates to the field of reliability, virtualized infrastructure and resource allocation; more particularly, the present invention relates to allocating resources in a virtual infrastructure with a reliability guarantee.

BACKGROUND OF THE INVENTION

Communication networks are shifting from the physical to the virtual. In the past, a communication network would be built using a physical infrastructure to support a given network. More and more, the infrastructure is becoming virtual. That is, instead of building a dedicated physical network, or instead of sharing a network with others that is not designed with a specific purpose in mind, virtual networks are being used in which a customized network that gives its user the appearance of a dedicated network, with specific, customized protocols, that is built on top of a shared physical substrate. The virtual network is a private network for its (virtual) operator, while the underlay is shared amongst different operators.

Virtualization has quickly transformed the way physical resources are utilized today. Originally designed for isolating servers and sharing resources over a physical server, virtualization provides fast and agile deployment as well as migration by allowing a server to be defined entirely by software. This turns computing into an elastic resource and is catching on fast with other commercial entities as well. The virtualization paradigm extends to networking. For instance, it enables multiple research groups to run multiple overlay testbeds across different virtual slices of a planetary-scale network. In fact, the agility and flexibility brought forward by virtualization has led researchers to believe that the next generation Internet can be de-ossified through a lean separation between infrastructure providers and service providers where a virtualized infrastructure is offered as a service.

One key aspect of such virtualized architecture is to properly assign the underlay resources to the virtual network on top. Since the resources used are virtualized, they can be placed at different spots in the physical underlay, and careful allocation of the virtual resources to Eli e physical is critical for the best performance of the network. When done properly, each virtual network performs better and the utilization (and thus reduce the costs) of the physical underlay is increased.

With infrastructure rapidly becoming virtualized, shared and dynamically changing, it is essential to provide strong reliability to the physical infrastructure, since a single physical server or link failure affects several shared virtualized entities. Reliability is provided by using redundancy. Currently, reliability is provided by duplicating resources. This is because reliability is provided at the physical layer. Thus, failure of a physical component is handled by bringing up another physical element. In a virtualized infrastructure, those are virtual elements that need to be backed up, and failure of a physical component implies the disappearance of some virtual components, and these virtual components have to be relocated onto other physical component.

Providing reliability is often linked with over-provisioning both computational, network, and storage capacities, and employing load balancing for additional robustness. Such high availability systems are good for applications where large discontinuity may be tolerable, e.g. restart of network flows while rerouting over link or node failures, or partial job restarts at node failures. A higher level of fault tolerance is required at applications where some failures have a substantial impact on the current state of the system. For instance, virtual networks with servers which perform admission control, scheduling, load balancing, bandwidth broking, AAA or other NOC operations that maintain snapshots of the network state, cannot tolerate total failures. In master-slave/worker architectures, e.g. MapReduce, PVM, failures at the master nodes waste resources at the slaves/workers.

Network virtualization is a promising technology to reduce the operating costs and management complexity of networks, and it is receiving an increasing amount of research interest. Reliability is bound to become a more and more prominent issue as the infrastructure providers move toward virtualizing their networks over simpler, cheaper commodity hardware.

Others have considered the use of "shadow VNet", namely a parallel virtualized slice, to study the reliability of a network. However, such slice is not used as a back-up, but as a monitoring tool, and as a way to debug the network in the case of failure.

Meanwhile there are some works targeted at node fault tolerance at the server virtualization level. At least one introduced fault tolerance at the hypervisor. Two virtual slices residing on the same physical node can be made to operate in synchronization through the hypervisor. However, this provides reliability against software failures at most, since the slices reside on the same node.

Others have made progress for the virtual slices to be duplicated and migrated over a network. Various duplication techniques and migration protocols were proposed for different types of applications (web servers, game servers, and benchmarking applications). Another system allows for state synchronization between two virtual nodes over time. It is, thus, practically possible to have redundant virtual nodes distributed over a network for reliability. However, these solutions do not address the resource allocation issue (in compute capacity) while having redundant nodes residing somewhere in the network.

At a fundamental level, there are methods to construct topologies for redundant nodes that address both nodes and links reliability. Based on some input graph, additional links (or, bandwidth reservations) are introduced optimally such that the least number is needed. However, this is based on designing fault tolerance for multiprocessor systems which are mostly stateless. A node failure, in this case, involves migrations or rotations among the remaining nodes to preserve the original topology. This may not be suitable in a virtualized network scenario where migrations may cause disruptions to parts of the network that are unaffected by the failure.

Fault tolerance is also provided in data centers. Redundancy is in terms of large excess of nodes and links. Some protocols are defined for failure recovery, but there is little guarantee of reliability.

SUMMARY OF THE INVENTION

A method and apparatus is disclosed herein for a resource allocation protocol. In one embodiment, the apparatus comprises a resource allocation engine to allocate physical resources to primary and redundant virtual infrastructures, wherein, when the resource allocation engine allocates virtual infrastructures, physical resources of redundant virtual infrastructures are shared across multiple primary virtual infrastructures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
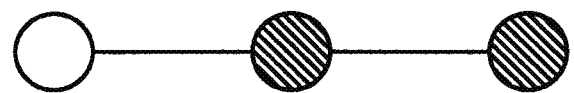
FIGS. 1A-C illustrate a comparison of fault tolerant architectures.
Figure 1:
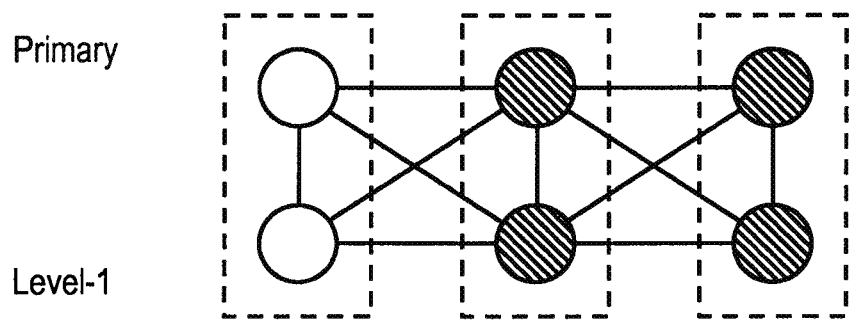
Figure 1:
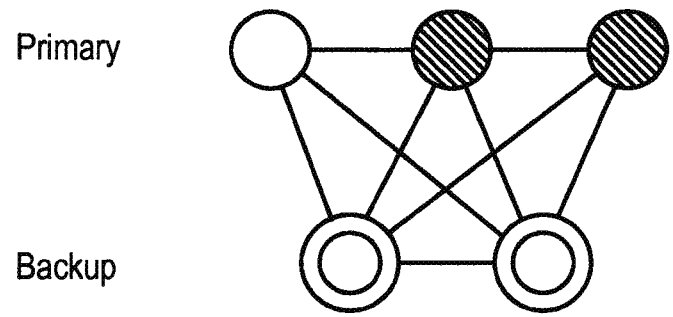

In the following, a n:k redundancy architecture is disclosed, where k redundant resources can be backups for any of the n primary resources, and share the backups across multiple virtual infrastructures (VIs). For example, two VIs with $n_1$ and $n_2$ computing nodes would require $k_1$ and $k_2$ redundancy to be guaranteed reliabilities of $r_1$ and $r_2$, respectively. Sharing the backups will achieve a redundancy of $k_0 < k_1 + k_2$ with the same level of reliability, reducing the resources that are provisioned for fault tolerance. In addition, there is joint node and link redundancy such that a redundant node can take over a failed node with guaranteed connectivity, bandwidth, and little disruption. Link failures can be recovered through the same mechanism.

Also disclosed herein is a method to statically allocate physical resources (e.g., compute capacity, storage, and bandwidth) to the primary and redundant VIs simultaneously. The method attempts to reduce resources allocated for redundancy by utilizing existing redundant nodes, and overlapping bandwidths of the redundant virtual links as much as possible.

Furthermore, a mechanism is disclosed to allocate a virtual infrastructure resource onto a physical substrate which provides reliability guarantees in a way which attempts to minimize, or significantly reduce, the use of the physical resource, and conversely, maximize the number of virtual resources that can be accommodated.

Building the reliability into the allocation of physical resources, and sharing redundancy nodes among several virtual networks, significantly reduces the amount of resource dedicated to reliability.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc Overview In one embodiment, resources are allocated using an allocation method that takes into account the reliability requirements of a virtual infrastructure request. Whereas methods exist to allocate physical resources to a virtual resource request, the allocation method described herein first provides an explicit reliability guarantee.

In one embodiment, the allocation mechanism receives a request for a set of resources (e.g., server resources) or fraction thereof, and links connecting these resources, and a reliability requirement, say 99.999% uptime. In one embodiment, the request is expressed as (G=(V,E),r) where V are the nodes, E the links connecting the nodes, and r the reliability. It then computes the number of redundant nodes to add to the request to provide the requested reliability. If it can combine this request with another one, and if there is a benefit from doing so, it combines the two requests. In one embodiment, the allocation mechanism determines whether or not it is beneficial to combine allocation requests. Thus, in one embodiment, the allocation mechanism aggregates requests and allocates physical redundancy resources in a way that attempts to reduce, and potentially minimize, the amount of physical resource set aside for the purpose of redundancy.

In one embodiment, after determining the amount of redundant nodes to add to the request, and the links to insert between the edges, the allocation mechanisms computes the new request G'=(V',E') and allocates this request, using a traditional multi-flow commodity problem. The multi-flow commodity problem is well-known in the art.

A Network Model

For purposes herein, a physical network infrastructure is used where both computing and network resources can be virtualized, segregated and shared among several entities. Requests for resources from a physical infrastructure are defined in terms of capacities and preferred locations of compute nodes, bandwidth between nodes, and a certain level of reliability on a subset of the requested nodes (and their links). Each incoming resource request is statically allocated together with the redundant infrastructure.

In one embodiment, the physical network is modeled as an undirected graph $G^P=(N^P,E^P)$, where $N^P$ is the set of physical nodes and $E^P$ is the set of links. Each node $u \in N^P$ has an available computational capacity of $M_u$. Each undirected link $(u, v) \in E^P$, $u, v \in N^P$ has an available bandwidth capacity of $H_{u,v}$. To simplify the multi-flow commodity problem, failures at physical nodes are assumed to be independent and uniform with probability p.

A resource request is modeled as an undirected graph $G^V=(N^V, E^V)$ with additional properties. $N^V$ is a set of compute nodes and $E^V$ is a set of edges. $\mu_x$ is the computation capacity requirement for each node $x \in N^V$, and bandwidth requirements between nodes are $\eta_{x,y}$, $(x, y) \in E^V$ and $x, y \in N^V$. Furthermore, $\Phi[x] \subseteq N^P$ is the additional constraint where the virtual node x can be mapped to. That is, to impose some specific mapping of a virtual node onto a physical node, it is specified as a constraint $\Phi[x]$, such that x can only be mapped to a subset of physical nodes. Note that this may be due to physical location preferences (as stated in the text) or physical node types (CPU nodes, storage nodes, router nodes). This represents any physical location preference, e.g. ingress and egress virtual routers, proximity to other nodes. As explained later, this set is also exploited for re-using/sharing redundant nodes from another VI that is already in place. Each request also consists of a set of critical virtual nodes $C^V \subseteq N^V$ and their associated links {(c, x)|(c, x)∈$E^V$, c∈$C^V$, x∈$N^V$}, which are to be protected with a reliability r. For purposes herein, the set of redundant nodes is denoted as $N^K$.

For consistency, i,j is used to represent any type of nodes, x, y, z∈$N^V$ is used to represent virtual nodes, u, v, w∈$N^P$ is used to represent physical nodes, c, d∈$C^V$ is used to represent critical nodes, and a, b∈$N^K$ is used to represent redundant nodes.

A Virtual Architecture for Redundancy

In one embodiment, an architecture for redundancy has the following characteristics:

n:k redundancy. As opposed to having 1:k levels of redundancy that results in utilization of at most $$\frac{1}{k+1},$$

better granularity and utilization can be achieved when the k redundant resource can be backups for any of the n primary resources.

Joint node and link redundancy. Redundant nodes and links are jointly provisioned such that, when a node fails, the redundant node takes over with guaranteed connectivity, bandwidth, and little disruption.

Disjoint location. Not more than one virtual or redundant node can be hosted on the same physical node.

As such, k redundant virtual nodes are provisioned such that the probability of the number of physical node failures being more than k, out of $|N^V|+k$ is no less than 1−r. In other words, the reliability is given as:

$$r \leq \sum_{i=0}^{k} \binom{n+k}{i} p^i \bar{p}^{n+k-i} \tag{1}$$
$$= I_{\bar{p}}(n, k+1)$$

where $n=|N^V|$, $\bar{p}=1-p$. The summation on the RHS is the equivalent of the regularized incomplete beta function $I_x(\cdot,\cdot)$, which is well known in the art.

In one embodiment, compute capacity and bandwidth are available in sufficient amounts to all k redundant nodes in times of failure. Hence, for both link and node failures, the recovery procedure will operate to bring up one or more of the k redundant nodes and utilize the reserved redundant resources. In one embodiment, migration or swapping of the virtual nodes is not allowed to assist in recovery as this may cause further disruption. Furthermore, since the redundant nodes may fail as well, a redundant node must be able to substitute for any node c∈$C^V$ in order to achieve the reliability stated in equation (1). As mentioned above, path-splitting is utilized in bandwidth reservation, which provides another layer of protection for links as well as graceful degradation.

The bandwidth reservations for redundancy are modeled as a set of weighted undirected virtual links L emanating from nodes of $N^K$, $$L \subseteq N^K \times (N^V \cup N^K) = (N^K \times N^V) \cup (N^K \times N^K) \quad (2)$$

That is, L is a union of two bipartite graphs, containing the links from the redundant nodes between themselves and with vertices in $N^V$. These links will be added to $G^V$ for virtual network embedding. More formally, L is defined by the two theorems below.

Theorem 1. Given $a \in N^K$ and $x \in N^V$. Then, $(a, x) \notin L$ iff $f(c, x) \in E^V$, $c \in C^V$. This states that a critical link $(c, x)$ must be backed-up by a link $(a, x)$ in L, so that if c is migrated to a due to failure, then x is still connected to the new location of the resource.

Proof Suppose $(a, x) \notin L$ and a virtual link $(c, x) \in E^V$ exists, such that $c \in C^V$. Then, the architecture does not have n:k redundancy as a does not have bandwidth provisioned to x if c fails. Similarly, if $f(c, x) \in E^V$, $c \in C^V$ and $(a, x) \in L$, then the bandwidth provisioned for $(a, x)$ will never be used if c fails.

Corollary 1. $(a, c) \notin L$ iff $(c, d) \notin E^V$, where $a \in N^K$ and c, $d \in C^V$.

Proof: This is a direct result from Theorem 1 by restricting the domain of x to $C^V$.

The above implies that the L consists of a bipartite graph $L^1$:

$$L^1 = \{(a,x) | \forall a \in N^K, \forall c \in C^V, \exists (c,x) \in E^V, x \in N^V\} \quad (3)$$

Theorem 2. Given a, $b \in N^K$. $(a, b) \notin L$ iff $f(c, d) \notin E^V$, $\forall c, d \in C^V$. This states that a link between each redundant nodes must exist if there are links between critical nodes.

Proof: Suppose a and b are not connected in L, but there exists a link $(c, d) \in E^V$. Then, there will be no bandwidth guarantee if c and d fails and migrate to a and b. Conversely, if $(a, b) \in L$ and $f(c, d) \in E^V$, the bandwidth provisioned for $(a, b)$ will never be used.

This results L to contain a complete graph among the redundant nodes of $N^K$ so long as there is a link between any two critical nodes. Denote by $L^2$ the complete graph between redundant nodes $$L^2 = \{(a,b) | a \neq b, \forall a, b \in N^K\} \quad (4)$$

Since $L = \subseteq (N^K \times N^V) \cup (N^K \times N^K)$, the minimal set of redundant links is given by $$L = \begin{cases} L^1, & (x, y) \in E^V, \forall x, y \in C^V \\ L^1 \cup L^2, & \text{otherwise} \end{cases} \quad (5)$$

This result requires more links than other proposed architectures. However, the latter result is based on the assumption that the recovered graph after failure contains $G^V$. It does not ensure that the nodes unaffected by failures need not be migrated in order to recover the original topology of $G^V$. This additional constraint is taken into consideration in constructing L. Nonetheless, L can be replaced by other solutions if this constraint is not required.

Below where bandwidth is provisioned with multi-commodity flows (MCF), that the bandwidth is reduced, or even minimized, by overlapping the redundant flows as much as possible. These overlaps are captured as constraints into the MCF model.

Sharing Redundancy

Below, the benefits of a n:k fault tolerant architecture and show how sharing redundant nodes may increase utilization are disclosed. For ease of discussion, it is assumed that $C^V = N^V$ herein.

Consider a small three-node virtual network in FIG. 1A. A simple and straightforward way to tolerate one-node failures is using 1:k tolerance, i.e., to replicate every virtual machine once, and creating logical links to the replicas and the primary nodes, as shown in FIG. 1B. A fault tolerance of $k_s$-node failures can be achieved with $k_s$ layers of replication. Assuming the failure probability of each physical node is p, the number of layers of redundancy required to achieve a node-reliability r, for a network of n nodes and e links, is $$k_s = \left\lceil \frac{\log\left(1 - r^{\frac{1}{n}}\right)}{\log p - 1} \right\rceil \quad (6)$$

Unfortunately, simple replications will add too many redundant nodes and logical links into the system: $k_s n$ and $k_s n + 3 k_s e$, respectively.

Compare this with the other approach where redundant nodes are backups for any of the three nodes in FIG. 1C, i.e., n:k. Node-reliability r can be provided with finer granularity and a lower number of redundant nodes and links, which is given by (1). The number of redundant nodes and links (max) are k and $$kn + \frac{k}{2}(k - 1).$$

Figure 2:
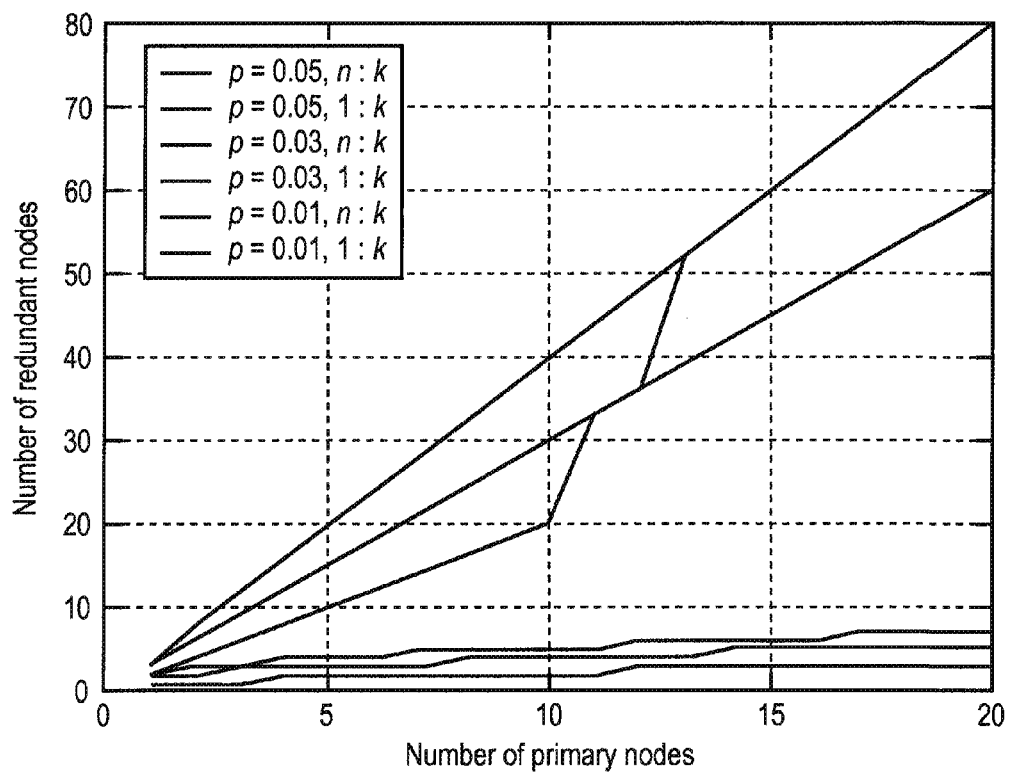
FIG. 2 illustrates a number of redundant nodes required for node-reliability of 99.999%.

FIG. 2 shows the comparison between the two approaches in terms of number of redundant nodes required for a node reliability of 99.999%.

Figure 3:
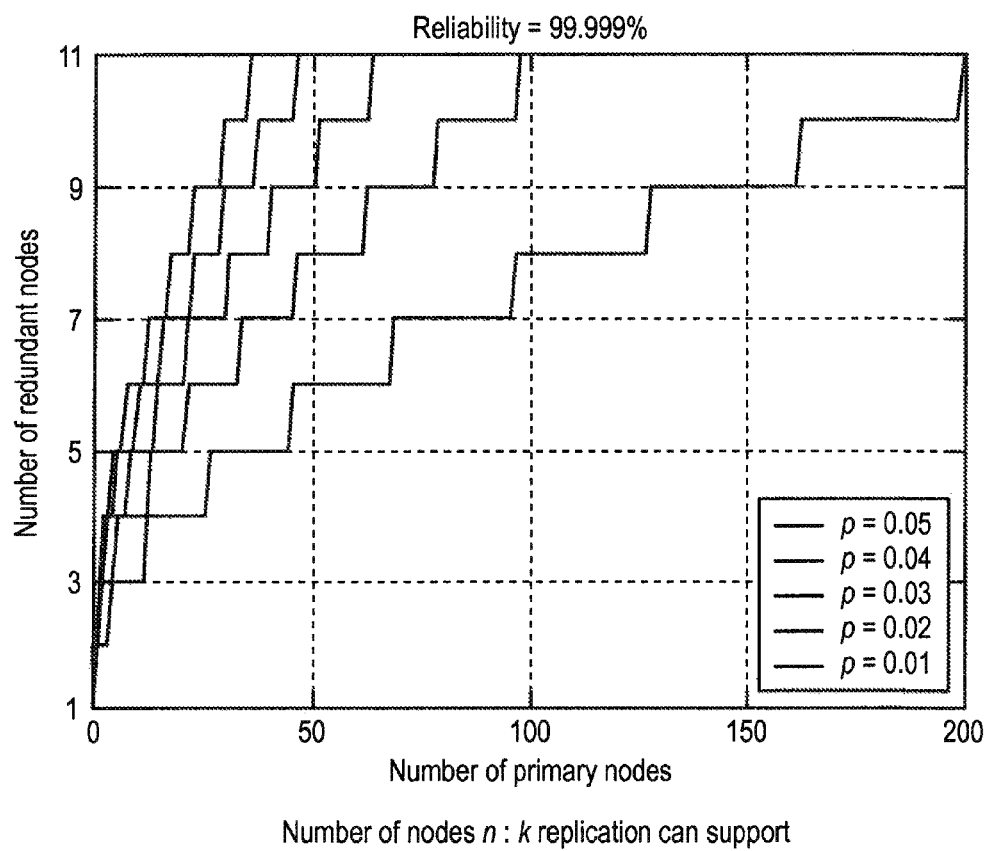
FIG. 3 illustrates a number of nodes n:k replication can support.

As expected, the number of redundant nodes grows much faster with the 1:k replication over n:k replication, for the same level of reliability. In fact, the n:k approach scales well, as seen in FIG. 3. One interesting trend is that for small values of k, n is super-linear. For example, for the failure probability p=0:01 curve, a 95-node VI requires k=7 for 99.999% reliability, and a 190-node VI requires k=10. At first glance, it is worthwhile to share k=10 redundant nodes than to provision for 7 redundant nodes each when allocating two 95-node VIs.

Note that n grows linearly for large k. Sharing no longer reduces the number of redundant nodes. Note also that the linear behavior of n versus k means that combining is not detrimental either. Given that the number of redundant links is at least nk, more bandwidth is reserved when sharing redundant nodes. On the other hand for small k, the reduction in number of redundant nodes is traded off for more redundant links.

There are two worthwhile ways to share redundant nodes:
1) Making use of the discrete jumps in k. For example, a 12-node VI uses 4 redundant nodes for 99:999% reliability. The same 4 nodes can support another 13 primary nodes for the same level of reliability.
2) Asymmetric sharing between VIs that require different level of reliability. For example, a 21-node VI uses 4 redundant nodes for 99:999% reliability. One of the 4 redundant nodes can be shared with another 5-node VI for 99:9% reliability. The reliability of the larger VI (when shared with m other VIs) can be computed as below:

$$r'_0 = 1 - \sum_{x=0}^{k'} Pr(x \text{ of } k' \text{ backups are down or used by } VInf\text{-}1, \ldots, VInf\text{-}m) \times Pr(\text{more than } k_0 - x \text{ nodes fail from } VInf\text{-}0 \text{ with } k_0 - k' \text{ backups})$$

As compared to the first method, these two methods of sharing are better because k remains unchanged after sharing. In cases where VIs are allocated sequentially, this ensures the running VIs do not require reconfiguration.

Resource Allocation Management and Application to Virtual Data Centers

In one embodiment, an initial management architecture autonomously manages reliability guarantees and resources of virtual entities (e.g., hosted services) in a virtualized data center. In this architecture, additional virtual backup nodes and their associated links are appropriately adjusted for any arbitrary level of reliability guarantee. The pools of redundancies over the entire data center are collectively managed so that more physical resources are available to new incoming services, despite having idle, redundant nodes. Furthermore, in one embodiment, the architecture is designed to be resilient against faults such that failure of some components does not bring down the entire data center.

In one embodiment, the redundancy mechanism supports fault tolerance at a per-customer level in a virtualized data center. The following provides an overview of the management of resources used for primary requests as well as additional redundancies for application to virtualized data centers. Note, however, these techniques are applicable to other virtualized environments and such would be apparent to those skilled in the art.

An Example of a Resource Request Model for a Virtualized Data Center

The resource request model is for requesting resources, such as those of a virtualized data center that leases its physical resources, e.g. Amazon EC2 cloud services and other cloud service providers. Rather than leasing independent server instances, in one embodiment, the model of resource requests correspond to an entire virtual infrastructure (VI) that includes the following:
1) worker and master nodes with minimum CPU capacity requirements, and
2) bandwidth guarantees between these nodes.

In one embodiment, worker nodes are essentially data-processors/number crunchers whereas master nodes are servers that coordinate the worker nodes' functions. A VI with multiple servers will have more than one master node. In addition, each VI request demands a reliability guarantee on the master nodes since they are critical points of failure. This can be modeled as a weighted graph with bandwidth guarantees as weighted edges between nodes, and the master nodes form a sub-graph. This model is generic enough to represent various needs.

A data center operator needs to manage all current leases and new incoming VI requests.

Virtual Backup Nodes for Reliability

In one embodiment, the management architecture reserves additional backup nodes with spare CPU and bandwidth capacities, in order to guarantee reliability on the critical master nodes. The states of all critical master nodes can be replicated and synchronized to every backup node using well-known optimized synchronization techniques. In the event of a node failure, any backup node is ready to be "hot-swapped" to replace the failed node.

Figure 4:
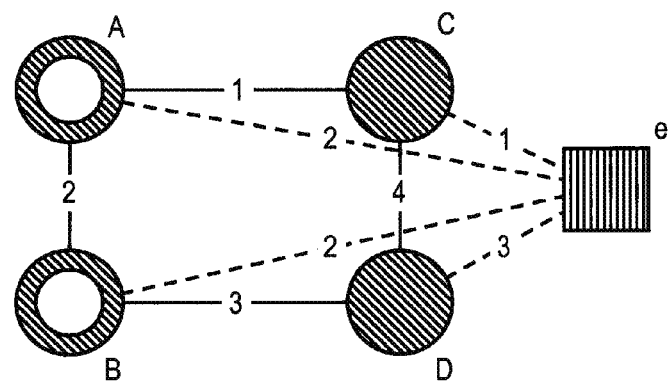
FIG. 4 shows an example of a VI with 1 backup node and respective fail-over bandwidths allocated.

FIG. 4 shows an example of a 4-node VI with 1 backup node and the respective fail-over bandwidths allocated. Referring to FIG. 4, a backup node (in black) and bandwidth reserved (in dotted lines) for reliability are shown on critical nodes A and B. The numbers on the links represent the bandwidth to be reserved. In this way, the backup node e can replace the critical nodes should they fail.

This can be extended easily for any k backup nodes to cover n critical nodes. For example, define by p the probability of failure of a physical node. It is assumed that p is i.i.d. for every physical node. In this case, the reliability r on the n critical nodes is computed as follows:

$$r \leq \sum_{i=0}^{k} \binom{n+k}{i} p^i \overline{p}^{n+k-i} \quad (1)$$

It is assumed that no more than one of the n+k nodes are hosted on the same physical node. Table I below shows the maximum number of critical nodes that can be supported by the number of backup nodes under various reliability guarantees for a physical node failure rate of 2%.

TABLE I

| NUMBER OF BACKUP NODES REQUIRED, p = 2% | | | | |
|---|---|---|---|---|
| Max. no of critical nodes (n) | | | | No. of |
| 99.9% | 99.99% | 99.999% | 99.9999% | backups (k) |
| 1 | 0 | 0 | 0 | 1 |
| 8 | 3 | 1 | 0 | 2 |
| 19 | 10 | 4 | 2 | 3 |
| 34 | 20 | 11 | 6 | 4 |

The number of backup nodes scale well for the range shown in Table I as the increase in the backup nodes is sub-linear. Hence, it is beneficial to pool the backup nodes together over several VIs so that the redundancy can be reduced, which in turn, leads to better resource utilization.

Scattered Allocation, Redundancy Mapping and Synchronization

Figure 5:
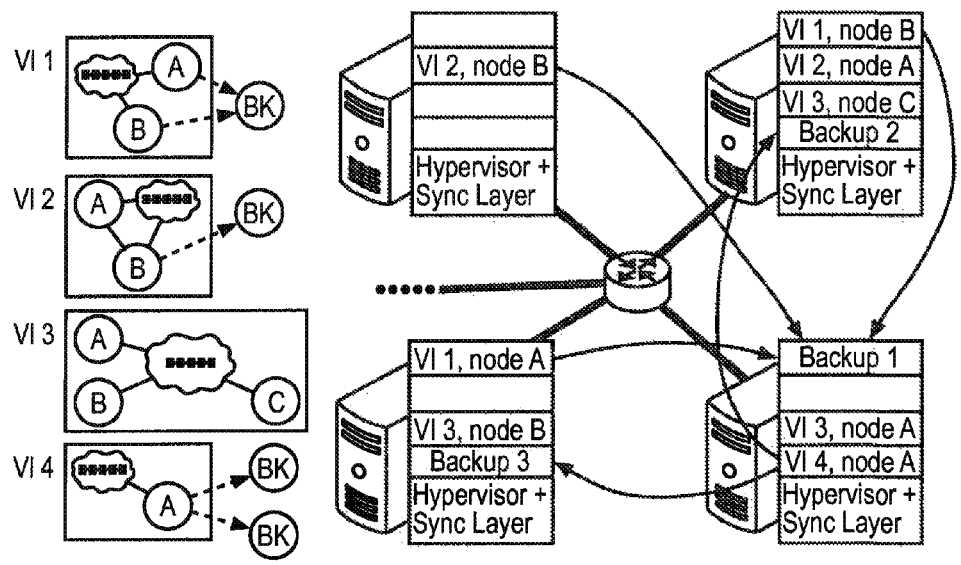
FIG. 5 illustrates an example of pooling redundancies and scattering virtual nodes by showing four VIs residing on a virtualized data center.

In one embodiment, in order to manage reliability effectively, all virtual nodes of the same VI and the respective backup nodes are not hosted onto the same physical node, i.e., they are scattered across the data center as much as possible. FIG. 5 illustrates an example of pooling redundancies and scattering virtual nodes by showing four VIs residing on a virtualized data center. None of the virtual nodes are stacked on the same physical node. Critical nodes synchronize their states to the backup nodes. In one embodiment, the synchronization mechanism is provided at the hypervisor layer for an almost seamless operation at the virtual nodes. Depending on the reliability level, some critical node may require more than 1 virtual backup node as in the case of VI-4 in FIG. 5, or none at all as in VI-3. Sometimes, the reverse may occur: virtual backup node 1 covers multiple nodes from multiple VIs, conserving CPU resource. This is referred to herein as redundancy pooling, and is described below.

Redundancy Pooling for Virtual Data Centers

The sub-linear relationship between n and k from Table I is exploited to reduce the total amount of backup nodes and thus idle CPU capacity, by pooling redundant nodes together and sharing them across several VIs. To illustrate, a VI with 5 critical nodes with 99.999% reliability guarantee needs 4 backup nodes reserved. Since the same 4 nodes can support up to a maximum of 11 critical nodes for the same level of reliability, another VI with up to 6 critical nodes can utilize the same 4 nodes without reserving additional backups.

However, redundancy pooling is not always "free"-haphazard pooling will lead to a significant cost in reserving the fail-over bandwidth that is associated with the backup nodes. The number of additional links added to a new VI request with n critical nodes and k backup nodes is at least $$kn + \frac{k}{2}(k-1),$$

where the first term represents all bandwidths reserved between the backup nodes and the critical nodes, and the latter represents bandwidths interconnecting the backup nodes. Hence, it is counter-productive to increase the number of backup nodes while pooling redundancy as that will increase the fail-over bandwidth as well.

Figure 6:
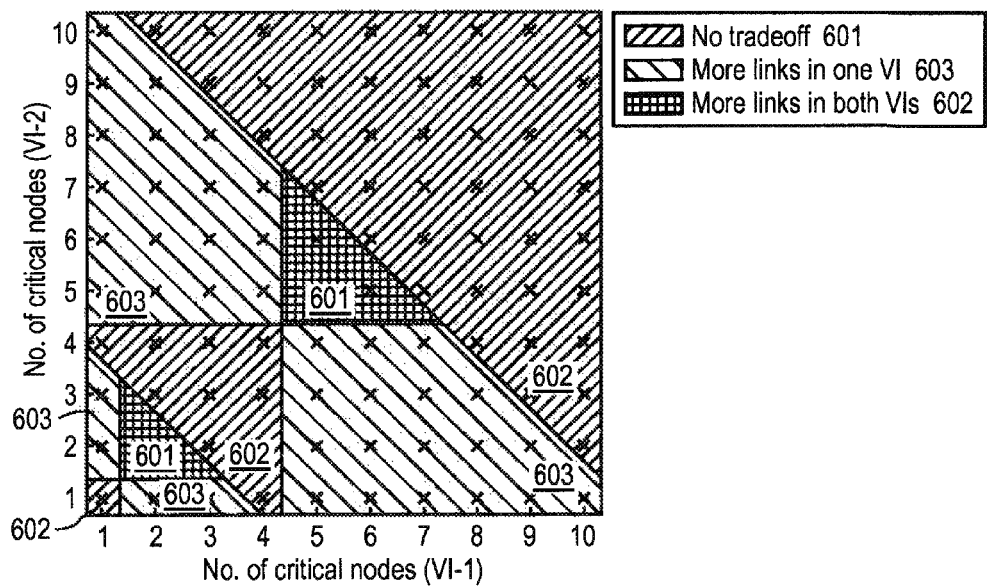
FIG. 6 illustrates this tradeoff when pooling backup nodes of two VIs.

FIG. 6 illustrates this tradeoff when pooling backup nodes of two VIs. Boundaries of these regions are the equations x+y≤n and x, y>n for all n from Table I. For easy visualization, these lines are shifted by a constant such that the boundary points are not on any line. Regions 601 indicate cases where it is completely worthwhile to pool backup nodes of VI-1 and VI-2. For example, at (5,6) where 5-node VI and a 6-node VI both requires 4 backup nodes each Assigning the same 4 backup nodes to both VIs guarantees the same reliability of 99.999%. This cannot be done for cases in the regions 602 without increasing the number of backup nodes to both VIs. E.g., at (3,2): Each VI requires only 3 backup nodes individually. However, combining the two gives 5 nodes will require an additional backup node, and thus more fail-over bandwidth. Regions 603 represent cases where only one VI needs more backup nodes than required.

Backup nodes supporting different reliability guarantees can be, pooled together as well, and have similar tradeoff regions. It all depends on the remaining "support capacity" of the backup nodes indicated in Table I.

A Resilient Architecture for a Virtualized Data Center

Figure 7:
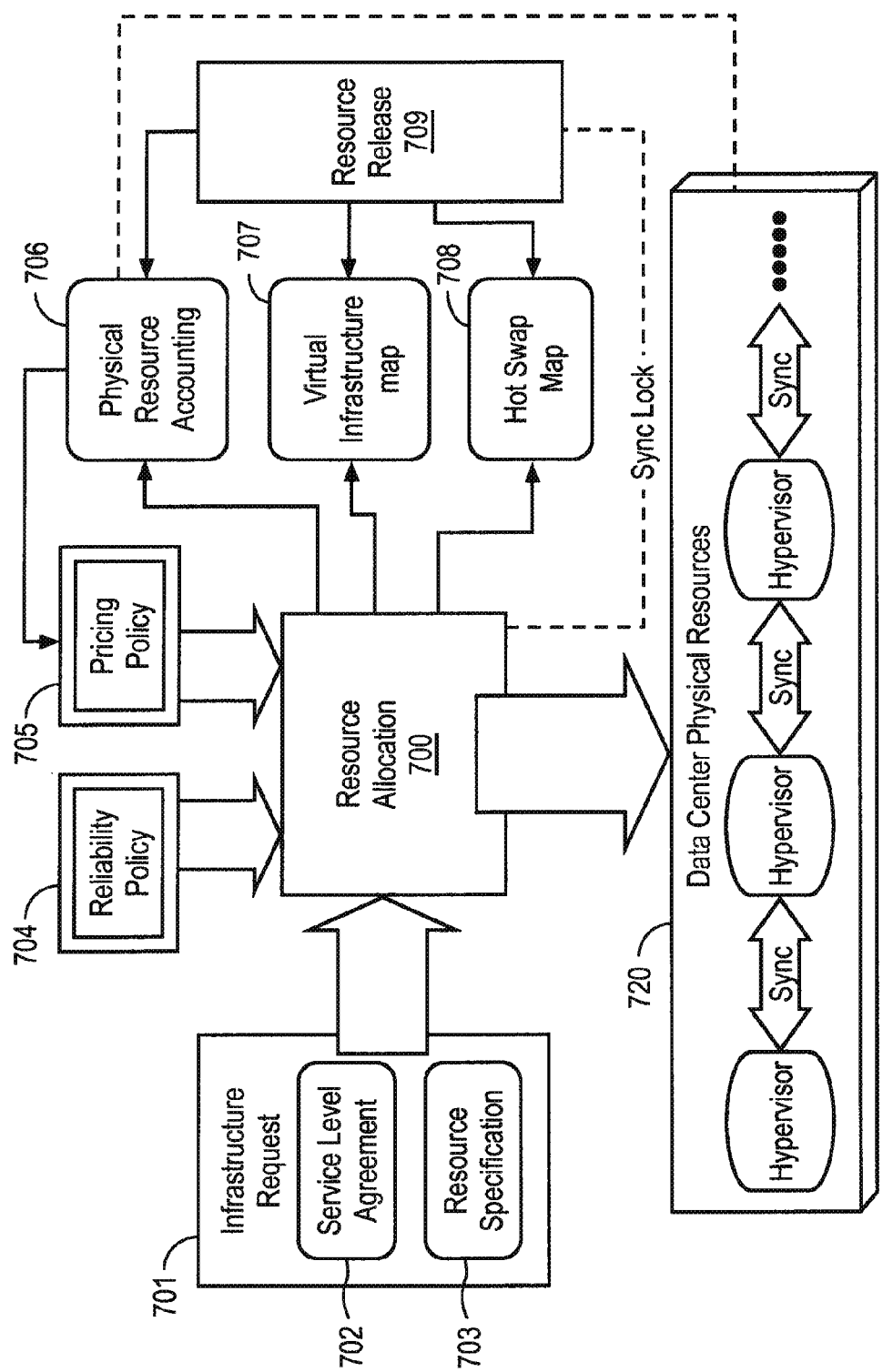
FIG. 7 illustrates one embodiment of a management architecture.

FIG. 7 illustrates one embodiment of a management architecture that sits on top Mlle physical resources of the virtualized data center and acts as a centralized controller to manage resource requests Each component is designed to be independently functioning entities and has measures to ensure resilience against faults.

Physical resource accounting component 706 keeps track of the remaining resources that are unallocated in the virtualized data center, which is needed during resource allocation for new incoming requests. Pricing, policy 705 draws its inputs from physical resource accounting component 706 in order to facilitate dynamic pricing. Only resource allocation engine 700 and resource release module 709 may update physical resource accounting component 706. In one embodiment, the updating occurs in response to request and leave events.

In one embodiment, there are two ways to ensure resilience for physical resource accounting component 706: either (i) a well-known fault resilient database is used, or (ii) multiple copies of the data are stored independently, with writes and reads to the data as multicasts and anycasts, respectively. In one embodiment, the data is stored as key-value tuples of the form: (PhyNode, rCPU) and (PhyLink, rBW), where PhyNode and PhyLink uniquely identify a physical node and link, respectively, and rCPU and rBW give the amount of available CPU and bandwidth resource, respectively.

As described above, at times there exists a tradeoff in conserving CPU and bandwidth when pooling backup nodes across VIs. In one embodiment, reliability policy 705 comprises a list of decision-rules that specify whether the backup nodes of a new incoming VI should be pooled with another existing VI in the data center. Graphically, these rules represent the boundaries of the tradeoff regions (see FIG. 6 as an example). The strategy to ensure resilience against faults is the same as physical resource accounting component 706.

Figure 8:
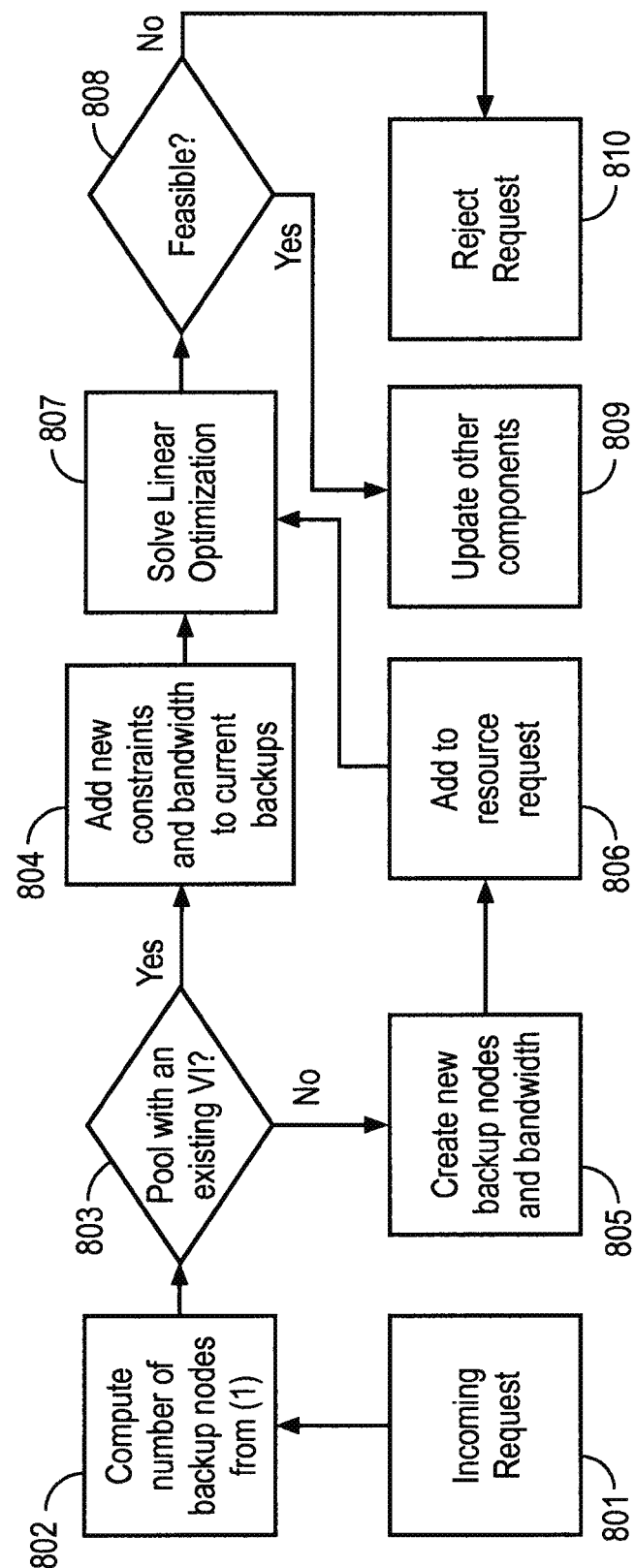
FIG. 8 is a flow diagram of one embodiment of a process for servicing each incoming request.

Resource allocation engine 700 is responsible for mapping and reserving resources to incoming requests. FIG. 8 is a flow diagram of one embodiment of a process for servicing each incoming request. The process is performed by processing logic in the resource allocation engine that may comprise hardware (e.g., logic, circuitry, etc.), software (such as is run on a general purpose computer system or dedicate machine), or a combination of both. Referring to FIG. 8, the process begins by processing logic receiving an incoming request (processing block 801). In response to receiving the incoming request, processing logic computes the number of backup nodes needed to accommodate the incoming request (processing block 802). Thereafter, processing logic tests whether to pool the backup nodes with an existing VI (processing block 803). If processing logic determines to pool the backup nodes with an existing VI, processing logic adds new constraints and bandwidth to current backups (processing block 804) and the process transitions to processing block 807. If not, processing logic creates new backup nodes and bandwidth (processing block 805), adds those new resources to the initial resource request for resource allocation, and the process transitions to processing block 807. At processing block 807, processing logic solves the Linear Optimization through an external tool. Examples of such tools include, but are not limited to, COIN CBC, iLog CPLEX and MOSEK.

Next, processing logic determines if the solution is feasible based on the available resources (processing block 808) through the output of the external tool. More specifically, the solver is run, and if the solver cannot find a solution with the given constraints, then no solution is feasible; if the solver returns a solution, then it is feasible. If it is, the processing logic updates other components (processing block 809) and the process ends. If not, processing logic rejects the resource request (processing block 810) and the process ends.

In one embodiment, the problem for mapping virtual nodes to physical nodes and virtual links to physical paths is formulated as a multi-commodity flow problem in a manner well-known in the art where bandwidth reservations between virtual nodes are flows between physical nodes and the presence of a flow between a virtual node and a physical node indicates a mapping. This is a linear optimization problem with the following objective:

$$P1: \min \sum_u \sum_x \alpha_{ux} \rho_{ux} \mu_{ux} + \sum_{u,v} \sum_l \beta_{uv}^l f_{uv}^l \qquad (2)$$

where $\rho$ and $f^1_{uv}$ are variables and $\rho$ is a boolean variable and is true if a virtual node x is mapped onto physical node u. $f^1_{uv}$ is the amount of bandwidth of a virtual link 1 "flowing" on physical link (u, v), and is non-negative. The classical flow conservation constraints for $f^1_{uv}$ apply, classical flow conservation constraints are well understood by a person skilled in the art. In addition, the constraints $$\sum_x \rho_{ux} = 1 \text{ and } \sum_u \rho_{ux} \leq 1 \qquad (3)$$

ensure a one-to-one mapping between the virtual and physical nodes, and that the virtual nodes are scattered as described in above. The total resources consumed by the new VI in terms of CPU and bandwidth are subjected to the amount of physical resources remaining as well, i.e., $$\sum_x \rho_{ux}\mu_x \leq rCPU_u \text{ and } \sum_l f^l_{uv} \leq rBW_{uv} \qquad (4)$$

and $\mu_x$ is the CPU capacity required by virtual node x. The inputs $\alpha_{ux}$ and $\beta^1_{uv}$ represent the net cost (minus revenue) per unit CPU and bandwidth, respectively, to the data center operator when the resources are leased. These are derived from the pricing policy which will be described below.

Addition of backup nodes and fail-over bandwidth depends on the reliability policy, i.e., whether the backup nodes are pooled. If not, the problem is straightforward as solving P1 with new backup nodes and bandwidth included. Otherwise, additional constraints on mapping variables $\rho_{ux}$ are appended to P1 to ensure no overlap between virtual nodes of the new VI and current virtual nodes, i.e., $\rho_{ux}=0$ for all occupied u.

The new request can only be accommodated if there is a feasible solution to P1. Then, the components linked to the resource allocation engine 700 via thin double-headed arrows, namely the VI map 707 and hot swap map 708, and the accounting component 706, are updated with the solution from P1. Otherwise, it is simply rejected due to insufficient physical resources.

A simple strategy for this main control component to be fault resilient is to execute the same request over multiple instances. A more efficient way would be to have several instances processing several requests, but using lower values of rCPUu and rBWuv to prevent race conditions. However, there will be a risk of over-rejections.

Pricing Policy

The pricing policy specifies the price of resources that influences the inputs $\alpha_{ux}$ and $\beta^1_{uv}$ of P1. There is no need to fixate on a pricing strategy to use here but rather a pricing module 705 is provided and is as generic as possible. In particular, dynamic pricing is supported, which can throttle demand and lead to more efficient utilization of resources. With inputs from physical resource accounting module 706 and feedback from resource allocation engine 705 over time, pricing module 705 can dynamically price virtual CPU and bandwidth in the following dimensions: reliability guarantee, type of physical resource (links, nodes), acceptance rate, and lease duration.

Virtual Infrastructure Map and Hot Swap Map

VI map 707 records all VIs that are admitted and mappings of the virtual entities to its physical resource, i.e., the map of a virtual node to its physical server and the amount of CPU reserved, and the map of a virtual link to a physical path and the amount of bandwidth reserved along that path. In addition, the pool of backup nodes which a VI use is also stored.

Hot swap map 708 records all current pools of backup nodes and the respective remaining support capacity. This information, together with the VI map, helps resource allocation engine 700 decide whether a new incoming VI can utilize the existing pool of backup nodes, or create another new pool for the new VI. In one embodiment, the resource allocation engine 700 writes to these two maps once a mapping solution for the new VI is obtained.

In one embodiment, the fault resilient strategy for these two components is the same as that of physical resource accounting module 706, since they are database-like components.

Resource Release

The resources used by a VI should be freed upon termination of a lease. To prevent race conditions, resource release module 709 acts as a garbage collector to temporarily hold these resources until a sync-lock with resource allocation engine 700 is released. In the event that this component should fail, a simple check with the two maps, and accounting verification of the physical resources will recover this component.

Synchronization and Recovery Mechanism

These two mechanisms are local services at every physical node functioning in a distributed manner. In one embodiment, synchronization between nodes are managed at the hypervisors of the physical nodes and monitoring between physical nodes can be through heart-beat, synchronization signals or other distributed monitoring methods that are well-known to those skilled in the art. When a fault is detected, the recovery procedure kicks in and preempts all ongoing operations at the control architecture. The hot swap nodes are chosen by the virtual neighbors of each VI in a distributed manner through uniform randomization, and ties are broken arbitrarily.

Thus, a fault tolerant architecture is disclosed that can autonomously manage reliability guarantees on virtual infrastructures hosted in a data center. Here, reliability is guaranteed through pools of virtual backup nodes and reserved fail-over bandwidths. Backups are pooled in order to conserve idle CPU capacity, and tradeoffs against bandwidth are defined. Physical resources for all virtual entities, including backups, are allocated via a linear optimization framework. Other components that track and account for resource utilization of the data center are defined as well. Each individual component is designed to operate independently and has measures to ensure resilience against faults.

Resource Allocation: A Mixed Integer Programming Problem

A VI resource allocation problem can be formulated as a mixed integer programming problem, analogous to the multi-commodity flow problem (MCF). Bandwidth demands between nodes are modeled as flows. The mapping between physical and virtual nodes are constructed by adding extra "mapping" edges and ensuring only one such edge is used per virtual node in resolving the flow problem, in a manner well-known in the art.

In one embodiment, MCF is used to map VI nodes and links to the physical infrastructure; however, the MCF constraints such that (i) the backup links L can overlap as much as possible, and (ii) mapping of the backup nodes are confined to a preferred set of physical nodes Φ. Algorithm 1 lists the procedure to obtain $\Phi$ and map the VI with its backup nodes and links into the physical infrastructure for a guaranteed reliability r.

Figure 9:
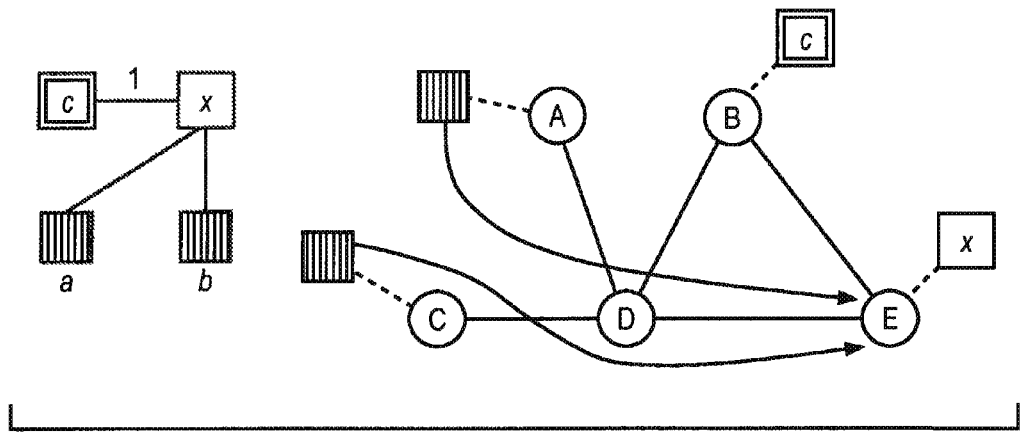
FIG. 9 illustrates an example of overlapping bandwidth reservation.

FIG. 9 shows an example of how bandwidth reservation can overlap. Referring to FIG. 9, on the left is a two-node virtual topology with two redundant nodes (in black). Node c is the critical node. Thus, bandwidths of 1 unit linking node x to the redundant nodes should be reserved, which may result in a reservation of 2 units on link DE. However, since the redundant nodes can take over only one instance of node c at any time, an over-reservation occurs. In MCF constraints formulation used herein, there is an attempt to maximize these overlaps over arbitrary topologies.

As stated above, it is worthwhile to ensure that the backup nodes of the existing VIs are unchanged while sharing them with the new incoming VI. A resource allocation procedure is given below. Lines 6-14 search greedily for a suitable VI with which to share its backup nodes. These VI candidates can be ordered in terms of "support capacity". For example, k=3 backup nodes can support between 8 to 21 virtual nodes for r=99:99%. A 8-node VI will have more support capacity than a 20-node VI, and is thus preferred. This ordering should take into account of VIs that are already being shared. Line 11 attempts to embed the VI with its backup nodes confined to the preferred physical locations $\Phi$. In the case where sharing is not possible, the backup nodes are chosen from anywhere in $N^P$ as in Line 15.

---

Algorithm 1: An Example of a Resource Allocation Procedure

```
 1:   procedure ALLOCATE(VirInf, PhyInf, r)
 2:     n ← |VirInf.N^V|
 3:     Compute k from n, r, p.            > inverse of (1)
 4:     Compute L from VirInf given k
 5:     VirInf.augment(N^K, L)
 6:     for all ç in PhyInf.getVIs( ) do   > ordered
 7:       if |ç.N^K| ≠ k then
 8:         continue
 9:       end if
10:       Φ ← phyLoc(ç.N^K)
11:       if MCF_OL(VirInf, PhyInf, Φ, ç) = True then
12:         return True
13:       end if
14:     end for
15:     return MCF_OL(VirInf, PhyInf, N^P, NULL)
16:   end procedure
```

---

Figure 10:
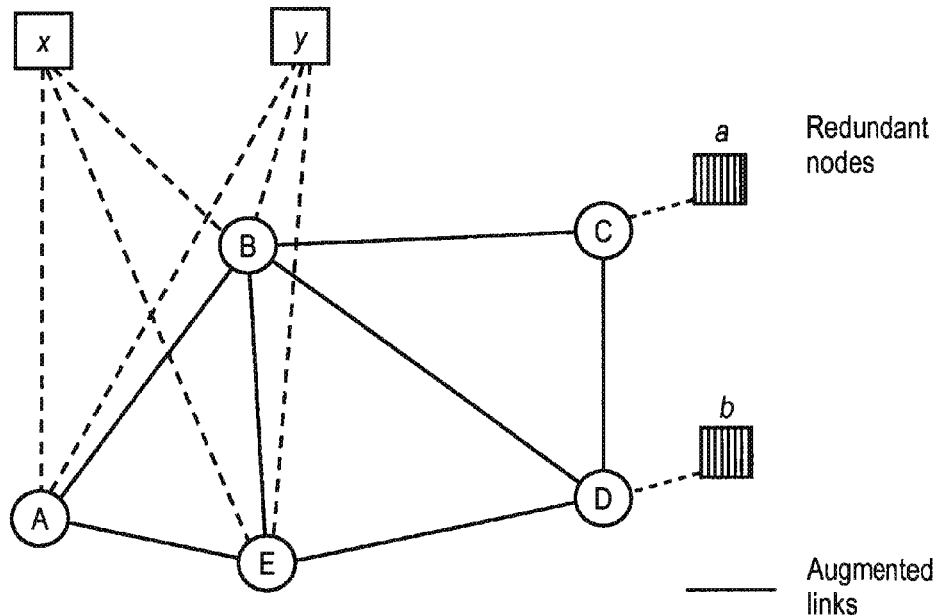
FIG. 10 illustrates an example of an augmented graph with positions of the redundant nodes fixed.

The MCF problem is defined as follows. Denote by $R^P$ the augmented edge set for mapping, such that $$R^P = \{(u,x),(x,u) | \forall x \in N^V \cup N^K, u \in \Phi[x]\} \quad (7)$$

where each edge has infinite bandwidth. $\Phi[x] \subseteq N^P$ is the set of physical nodes where virtual node x can be hosted. If x is a backup node and is to be shared with another VI's backups, then $\Phi[x]$ equals to $\Phi$ defined in Algorithm 1. FIG. 10 shows an example of this augmented structure. Nodes a and b are redundant nodes of another VI. These nodes reside on physical nodes C and D and can be redundant nodes for the new VI with nodes x and y. Since node of the same VI may not be hosted in the same physical node, $\Phi[a]=\{C\}$, $\Phi[b]=\{D\}$, and $\Phi[x]=\Phi[y]=\{A,B,E\}$.

Three sets are defined as follows:

$$N^A = N^P \cup N^V \cup N^K \quad (8)$$

$$E^A = E^P \cup R^P \quad (9)$$

$$C^K = C^V \cup \{x | x \in N^V, \exists (c,x) \in E^V, \forall c \in C^V\} \quad (10)$$

where $N^A$ is the set of all virtual, physical and redundant nodes, $E^A$ is the set of physical and mapping edges, and $C^K$ is the set of nodes which the redundant nodes are linked to in $L^1$.

In one embodiment, the bandwidth reservations between virtual nodes and backup nodes are modeled as flows. The amounts of bandwidth used by these flows are variables to the MCF problem. In one embodiment, there are four types of flows:

Flows between two virtual nodes $x, y \in N^V$. The amount of bandwidth used on a link $(i, j) \in E^A$ is denoted by $f^{xy}[ij]$.

$L^1$: flows between a redundant node $a \in N^K$ and virtual node $y \in C^K$. The actual bandwidth on any of these flows is zero, unless a redundant node a takes over some virtual node x. The amount of bandwidth used on a link $(i, j) \in E^A$ when such a recovery occurs is denoted by $f_{L^1}^{axy}[ij]$. This allows for modeling the overlaps between redundant flows.

Aggregate flows on a link between redundant nodes $N^K$ and a virtual node $x \in C^K$. This reflects the actual amount of bandwidth reserved after overlaps on link $(i, j)$. This is denoted by $f_o^x[ij]$.

$L^2$: flows between two redundant nodes $a, b \in N^K$. The amount of bandwidth used on a link $(i, j) \in E^A$ is denoted by $f_{L^2}^{ab}[ij]$. Unlike $f_{L^1}$ flows, these flows are not overlapped. This is to avoid the trivial solution of having a path $(a, x, b)$ linking nodes a and b through virtual node x, which does not provide extra reliability over $L^1$ links.

In one embodiment, the bi-directional mappings between a physical node and a virtual or a redundant node is modeled with a binary variable $\rho_{ij}$, $(i, j) \in R^P$. $\rho_{ij}=1$ if the total amount of flow flowing through the links $(i, j)$ and $(j, i)$ is positive, 0 otherwise. Hence, if the solution to MCF gives $\rho_{xu}=1$, virtual node x is hosted on physical node u.

The objective function of the MCF is defined as:

$$\min \sum_{w \in N^P} \alpha_w \sum_{x \in N^V} \rho_{xw}\mu_x + \\ \sum_{(u,v) \in E^P} \beta_{uv} \times \left[ \sum_{x \in C^k} f_o^x[uv] + \sum_{(a,b) \in L^2} f_{L^2}^{ab}[uv] + \sum_{(x,y) \in E^V} f^{xy}[uv] \right] \quad (11)$$

where $\alpha_w$ and $\beta_{uv}$ are node and link weights, respectively. It minimizes the weighted sums of computation and bandwidths allocated. To achieve load balancing, the weights can be set as $1/M_w+\delta$ and $1/H_{uv}+\delta$, respectively. The constraints to the MCF are as follows.

Mapping Constraints:

$$\sum_{u \in \Phi[x]} \rho_{ux} = 1, \forall x \in N^V \cup N^K \quad (12)$$

$$\sum_{x \in N^V \cup N^K} \rho_{xu} = 1, \forall u \in N^P \quad (13)$$

$$\rho_{ij} \leq H_{ij}, \forall (i, j) \in R^P \quad (14)$$

$$\rho_{ij} = \rho_{ji}, \forall (i, j) \in R^P \quad (15)$$

Constraints (12) and (13) ensure that each virtual node is only mapped on one single physical node, and no more than one virtual node can be mapped onto one physical node.

Constraints (14) and (15) force the binary variable $\rho_{ij}$ to be 1 when a feasible flow is mapped on link (i, j), and 0 otherwise.

Compute Capacity Constraints (Contingent on Sharing):

$$\rho_{iu}\mu_u \leq M_u, \forall u \in N^P, \forall i \in N^V \cup N^K \quad (16)$$

This ensures that the mapped virtual and redundant nodes do not exceed the available capacity $M_u$ on physical node u. For redundant nodes $a \in N^K$, the maximum capacity to be provisioned is $\max_{u \in C^V} \mu_u$. Furthermore, only the balance needs to be provisioned if this capacity exceeds that of the shared redundant nodes.

Flow Conservation Constraints for Bandwidth Reservation Between Two Virtual Nodes:

$$\sum_{u:(x,u)\in R^P} [f^{xy}[xu] - f^{xy}[ux]] = \eta_{xy}, \quad \forall (x, y) \in E^V \quad (17)$$

$$\sum_{u:(u,y)\in R^P} [f^{xy}[yu] - f^{xy}[uy]] = -\eta_{xy}, \quad \forall (x, y) \in E^V \quad (18)$$

$$\sum_{i \in N^A} [f^{xy}[ui] - f^{xy}[iu]] = 0, \quad \forall u \in N^P, \forall (x, y) \in E^V \quad (19)$$

Constraints (17) and (18) define the total bandwidth $\eta_{xy}$ of a virtual link (x, y) originating from virtual node x to virtual node y. Constraint (19) ensures that the flow is conserved at the intermediate physical nodes, i.e., the total bandwidth flowing out of node u equals the total bandwidth flowing into that node.

Flow Conservation and Overlap Constraints for Reserving Bandwidth on $L^1$ Links:

$$\sum_{u:(a,u)\in R^P} [f_{L^1}^{acy}[au] - f_{L^1}^{acy}[au]] = \eta_{cy}, \quad (20)$$

$$\forall (a, y) \in L^1, \forall c \in C^V$$

$$\sum_{u:(u,y)\in R^P} [f_{L^1}^{acy}[yu] - f_{L^1}^{acy}[uy]] = \eta_{cy}, \quad (21)$$

$$\forall (a, y) \in L^1, \forall c \in C^V$$

$$\sum_{i \in N^A} [f_{L^1}^{acy}[ui] - f_{L^1}^{acy}[iu]] = 0, \quad (22)$$

$$\forall u \in N^P, \forall (c, y) \in E^V, \forall a \in N^K$$

$$\sum_{a \in N^K, c \in F, (c,y)\in E^V} f_{L^1}^{acy}[ij] \leq f_o^y[ij], \quad (23)$$

$$\forall (i, j) \in E^A, \forall y \in C^K, \forall F \subseteq C^V, |F| \leq k$$

For each flow to virtual node y in which a redundant node a substitutes for a critical node x, constraints (20)-(22) define the flow conservation model that is similar to that of the virtual flows in (17)-(18). Constraint (23) handles redundant flows which may overlap instead of being summed together over all a. Only one redundant node a may substitute for a critical node c at any time instant. Then, flows $f_{L^1}^{acy}[ij]$ and $f_{L^1}^{bcy}[ij]$ may overlap, i.e., for a link (i,j), $$\max_{a \in N^K} f_{L^1}^{acy}[ij] \leq f_a^y[ij]$$

However, overlaps may not occur for flows $f_{L^1}^{acy}[ij]$ and $f_{L^1}^{bdy}[ij]$ where redundant node a substitutes for critical node c, and another node b substitutes for critical node d. This occurs up to a maximum of k substitutes. Constraint (23) captures these relations.

Flow Conservation Constraints for Reserving Bandwidth on $L^2$ Links (Contingent on Sharing and $C^V$):

$$\sum_{i \in N^A} [f_{L^2}^{acy}[ui] - f_{L^2}^{ab}[iu]] = 0, \quad (24)$$

$$\forall u \in N^P, \forall (a, b) \in L^2$$

$$\sum_{u:(a,u)\in R^P} [f_{L^2}^{ab}[au] - f_{L^2}^{ab}[ua]] = \max_{x,y \in C^V} \eta_{xy}, \quad (25)$$

$$\forall (a, b) \in L^2$$

$$\sum [f_{L^2}^{ab}[bu] - f_{L^2}^{ab}[ub]] = -\max_{x,y \in C^V} \eta_{xy}, \quad (26)$$

$$\forall (a, b) \in L^2$$

The flow conservation constraints between two redundant nodes a and b are no different from that of the virtual flows in (17)-(19). The bandwidth to be provisioned is the maximum of those virtual links that interconnect nodes of $C^V$. However, these constraints are only needed in two cases:

1) $L^2 \neq \emptyset$. From Theorem 2, we only need to provision bandwidth for $L^2$ if there are virtual links interconnecting the critical nodes.
2) Sharing. Bandwidth is already provisioned in the VI that is to be shared. If that is not enough, these constraints exist to provision the balance.

Link Capacity Constraints on Physical Links:

$$\sum_{x \in C^K} [f_o^x[uv] + f_o^x[vu]] + \sum_{(a,b)\in L^2} [f_{L^2}^{ab}[uv] + f_{L^2}^{ab}[vu]] + \quad (27)$$

$$\sum_{(x,y)\in E^V} [f^{xy}[uv] + f^{xy}[vu]] \leq H_{uv}, \forall (u, v) \in E^P$$

Constraint (27) accounts for all flows on a physical link (u, v) in both directions. This should be less than the physical remaining bandwidth $H_{uv}$.

Link Capacity Constraints on Augmented Mapping Links:

$$\sum_{x \in C^K} [f_o^x[ij] + f_o^x[ji]] + \sum_{(a,b)\in L^2} [f_{L^2}^{ab}[ij] + f_{L^2}^{ab}[ji]] + \quad (28)$$

$$\sum_{(x,y)\in E^V} [f^{xy}[ij] + f^{xy}[ji]] \leq H_{ij}\rho_{ij}, \forall (i, j) \in R^P$$

Strictly speaking, there should be no constraints on the mapping links since the bandwidth $H_{ij}$ is infinite. However, this constraint, in conjunction with the mapping constraints (14) and (15), forces the mapping binary variable $\rho_{ij}$ to be 1 if there is any positive flow on that link in either direction, and 0 otherwise.

Domain Constraints:

$$f^{xy}[ij] \geq 0, \forall i,j \in N^A, \forall (x, y) \in E^V \quad (29)$$

$$f_{L^1}^{ax}[ij] \geq 0, \forall i,j \in N^A, \forall (a,z) \in L^1 \quad (30)$$

$$f_{L^2}^{ab}[ij] \geq 0, \forall i,j \in N^A, \forall (a,b) \in L^2 \quad (31)$$

$$f_o^x[ij] \geq 0, \forall i,j \in N^A, \forall x \in C^K \quad (32)$$

$$\rho_{ij} \in \{0,1\}, \forall (i,j) \in R^P \quad (33)$$

These are the domain constraints on all the variables of this modified MCF problem: all flows must be non-zero and the mapping variables are binary.

As infrastructures are rapidly becoming virtualized, there is an increasing need to provide reliability guarantees to the virtualized infrastructure. Above, a reliability guarantee on the virtualization layer itself is described. Redundant nodes can be virtual nodes which are distributed across the network. To this end, a n:k redundant architecture is proposed complete with bandwidth provisioned, as well as a method to allocate the virtualized network over the physical network. In order to conserve resources used by the redundant nodes and links, these redundant nodes can be shared across VIs, and their bandwidths be overlapped during provisioning.

An Example of a Computer System

Figure 11:
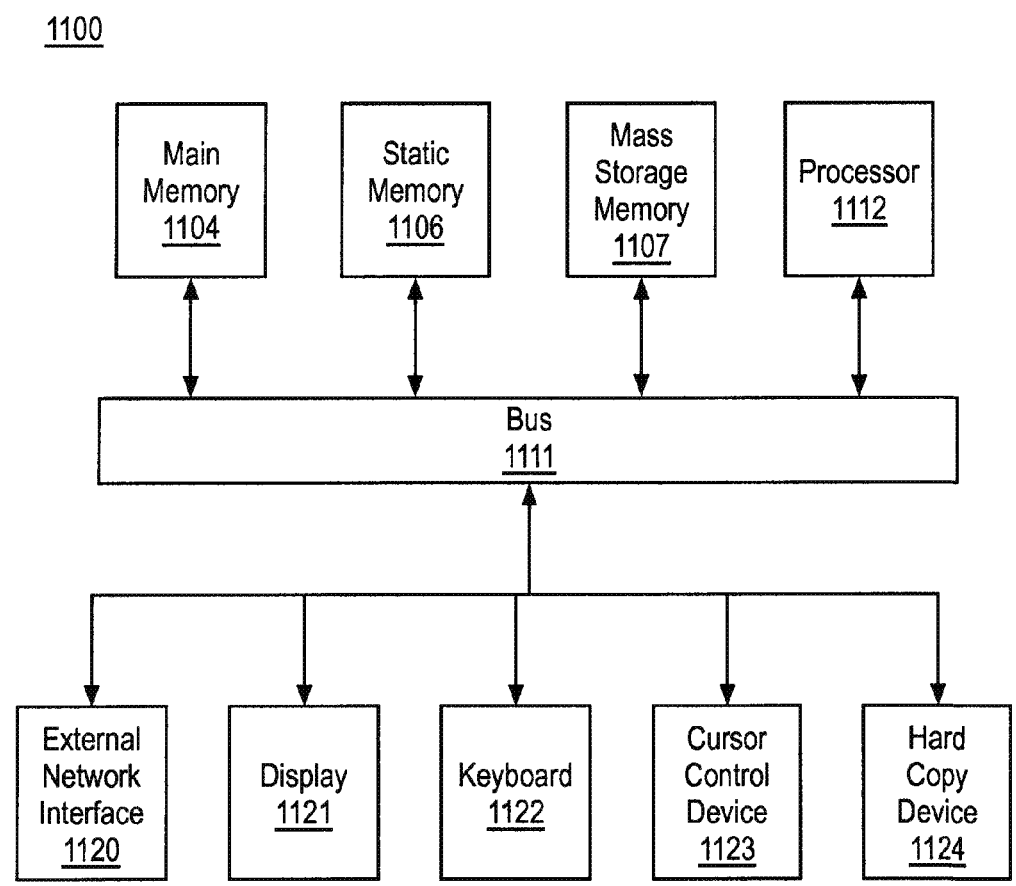
FIG. 11 is a block diagram of a computer system.

FIG. 11 is a block diagram of an exemplary computer system that may perform one or more of the operations described herein. Referring to FIG. 11, computer system 1100 may comprise an exemplary client or server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, PowerPC™, Alpha™, etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for marking information on a medium such as paper, film, or similar types of media. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A resource allocation method for allocating physical resources to primary and redundant virtual infrastructures, the method comprising:

receiving a first request for a set of resources, links connecting the resources, and a requested reliability requirement; and computing a number of redundant nodes to provide the requested reliability based on a probability of joint failure of at least two resources from the set of resources, including provisioning k redundant virtual resources with links to each of the set of resources, wherein the k redundant virtual resources are back up resources for any of n number of primary resources to achieve n:k replication that satisfies the requested reliability requirement, where n is the number of primary resources, k is the number of redundant virtual resources, and k is less than n.

2. The method defined in claim 1 wherein each of the resources comprises a node.

3. The method defined in claim 1 wherein the physical resources comprise compute capacity and bandwidth.

4. The method defined in claim 1 further comprising determining redundant links to insert between nodes.

5. The method defined in claim 1 further comprising:

computing respective reliabilities of the first request and that of an existing, allocated request when redundant resources of the existing, allocated request are shared with the first request;

determining whether to combine redundant resources of the first request with that of the existing, allocated request based on the computed reliabilities and available physical resources; and combining the redundant resources of the first request with that of the existing, allocated request based on results of determining whether to combine redundant resources of the first request with that of the existing, allocated request.

6. The method defined in claim 1 wherein the resources comprises server resources and links connecting these resources.

7. The method defined in claim 1 wherein the reliability requirement relates to at least one application.

8. The method defined in claim 1 further comprising modeling bandwidth reservations between virtual nodes as flows.

9. The method defined in claim 1 further comprising modeling bi-directional mappings between a physical node and a virtual or redundant node with a binary variable.

10. The method defined in claim 1 wherein each virtual node is only mapped on a single physical node, and no more than one virtual node is mapped onto one physical mode.

11. An article of manufacture having one or more recordable storage media storing instruction thereon which when executed by a system cause the system to perform a method for allocating physical resources to primary and redundant virtual infrastructures, the method comprising:

receiving a first request for a set of resources, links connecting the resources, and a requested reliability requirement; and computing a number of redundant nodes to provide the requested reliability based on a probability of joint failure of at least two resources from the set of resources, including provisioning k redundant virtual resources with links to each of the set of resources, wherein the k redundant virtual resources are back up resources for any of n number of primary resources to achieve n:k replication that satisfies the requested reliability requirement, where n is the number of primary resources, k is the number of redundant virtual resources, and k is less than n.

12. The article of manufacture defined in claim 11 wherein each of the resources comprises a node.

13. The article of manufacture defined in claim 11 wherein the physical resources comprise compute capacity and bandwidth.

14. The article of manufacture defined in claim 11 wherein the method further comprises determining redundant links to insert between nodes.

15. The article of manufacture defined in claim 11 wherein the method further comprises:

computing respective reliabilities of the first request and that of an existing, allocated request when redundant resources of the existing, allocated request are shared with the first request;

determining whether to combine redundant resources of the first request with that of the existing, allocated request based on the computed reliabilities and available physical resources; and combining the redundant resources of the first request with that of the existing, allocated request based on results of determining whether to combine redundant resources of the first request with that of the existing, allocated request.

16. The article of manufacture defined in claim 11 wherein the resources comprises server resources and links connecting these resources.

17. The article of manufacture defined in claim 11 wherein the reliability requirement relates to at least one application.

18. The article of manufacture defined in claim 11 wherein the method further comprises modeling bandwidth reservations between virtual nodes as flows.

* * * * *